Sept. 27, 1960   G. O. HUFSTADER   2,953,910
UNIVERSAL JOINT EXPANSION BALL
Original Filed March 20, 1959
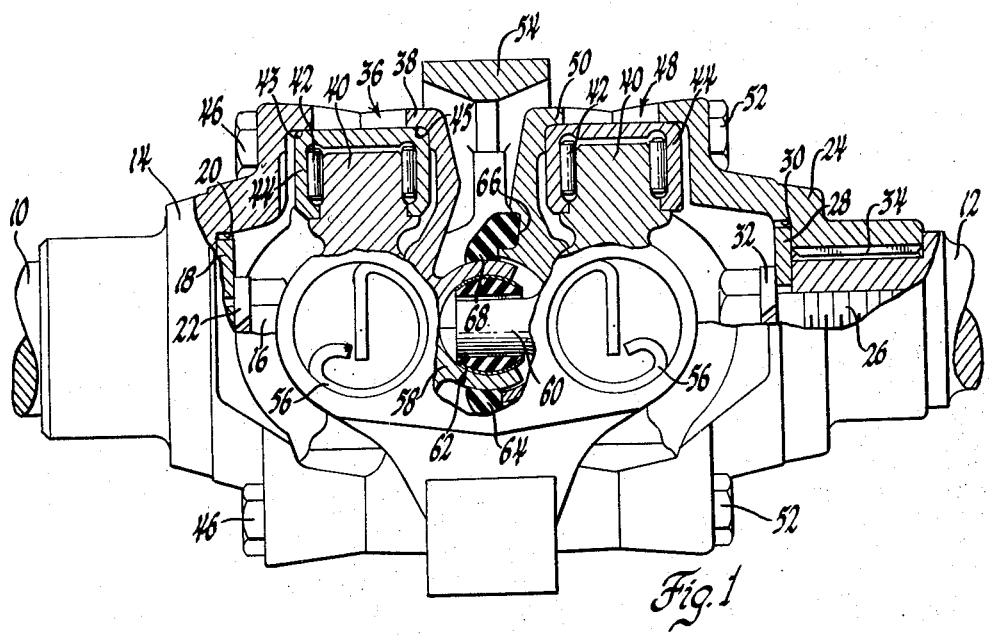
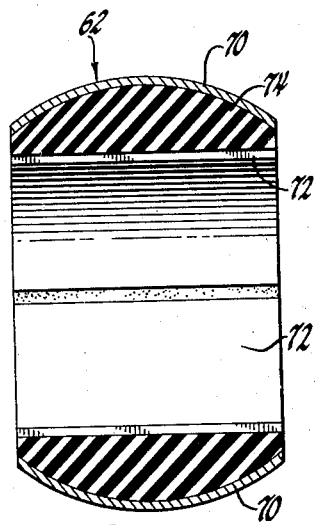
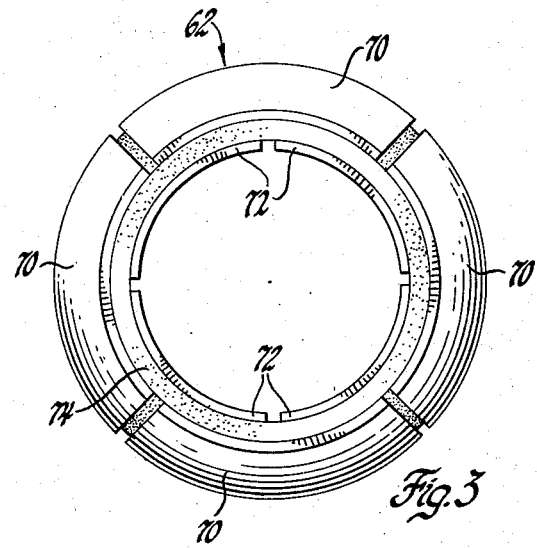
INVENTOR.
Gibson O. Hufstader
BY
L. D. Burch
ATTORNEY

United States Patent Office 2,953,910
Patented Sept. 27, 1960

2,953,910

UNIVERSAL JOINT EXPANSION BALL

Gibson O. Hufstader, Warren, Mich., assignor to General Motors Corporation, Detroit, Mich., a corporation of Delaware Original application Mar. 20, 1959, Ser. No. 800,687. Divided and this application Sept. 3, 1959, Ser. No. 837,935

7 Claims. (Cl. 64—17)

This invention relates to universal joints and more particularly to the type of a universal joint in which two standard cardan joint sections are used, with a connecting member joining them together, and a centering device between the two adjacent cardan sections positions the sections for proper operation.

This application is a division of the copending application Serial No. 800,687, filed in the name of Gibson O. Hufstader, on March 20, 1959.

The function of a double cardan universal joint depends on the internal balancing of the force couple generated in one cardan section with the opposite couple generated in the other cardan section. It has been well known in the past to accomplish the force balancing by means of a ball and socket joint located between the two cardan sections. A centering ball generally supports a small pilot shaft extension of one of the cardan members and is received in a socket member supported by the opposite joint section.

In the operation of the known double universal joint, a downward force produced at one cardan section is transmitted to the ball joint through the pilot shaft. This downward force is balanced by an equal and opposite force developed in the other cardan section and acting on the ball socket. The existence of radial clearance, of an appreciable amount above a very minimum value, or any wear that takes place between the parts, allows the force change in the ball socket to move the shaft from side to side within the ball, and thus allowing the ball to move from side to side within the ball socket. This side to side motion in the ball socket, twice for each revolution of the joint, produces a metallic sound which, when multiplied times the shaft speed, builds up a continuous tone distinguishable from other car sounds and one that is definitely objectionable. A further disadvantage resulting from the side to side motion in the socket is the possibility of chucking in the parts and the consequent deformation thereof. Because of this, the known joints have an extremely low life.

It is here proposed to provide a double cardan universal joint having the pilot shaft, ball and socket positioning means, and to keep the total radial clearance between the pilot shaft portion, ball, and socket portion to minimum, to reduce the impact as the load is changed and thus reduce the sound produced at each revolution. This is accomplished by means of a centering ball that will maintain zero to minimum radial clearance and still not be sufficiently tight to produce binding or heating from friction. This freedom from binding or heating is required to insure adequate durability of the centering ball for the life of the driveline. The proposal is accomplished by means of a centering ball having separable sections, the sections being spaced by some resilient member such that the ball assembly may expand or contract depending on the clearance allowed or the takeup desired.

Through the use of the proposed centering ball, it is found that the objectionable vibration noise is reduced to a minimum as is the possibility of chucking, and the operation of the double cardan universal joint is made longer lasting and more efficient.

In the drawings:

Figure 1 is a view with parts broken away and in section of the universal joint assembly embodying the invention.

Figure 2 is an enlarged cross-sectional view of the expansible centering ball for use with the universal joint of Figure 1.

Figure 3 is an elevational view of the centering ball illustrated in Figure 2.

Referring more particularly to the drawings, Figure 1 illustrates the double cardan type universal joint connecting two portions of a propeller shaft, such as propeller shaft portion 10 and propeller shaft portion 12. A cardan yoke 14 is secured to the shaft portion 10, as by a bolt 16 and a washer 18, the washer being received in an annular groove 20 formed in the yoke 14. A lock washer 22 insures a sufficiently tight connection. Similarly, the cardan yoke section 24 may be secured to the shaft portion 12 by a bolt 26 and washer 28 the washer being received in the groove 30 formed in the yoke section. A lock washer 32 insures a secure connection. The yoke sections 14 and 24 may be splined to the shaft sections 10 and 12, as indicated at 34, for positive rotation of one by the other. This would be accomplished by an internal spline formed in the yoke sections 14 and 24 and a mating external spline formed on the surface of the shaft portions 10 and 12.

A spider and bearing assembly, indicated generally by the numeral 36, is received between the yoke portion 14 and the mating member 38. The spider and bearing assembly comprises four shaft sections 40, extending at right angles to each other, and each having an annulus of needle bearings 42 and a bearing cap 44 secured on the end thereof. The yoke member 14 and mating member 38 are clamped together by means of a plurality of bolts 46 which secure the bearing caps 44. The bearing caps are located, with respect to the axis of the drive line, by shoulders 43 and 45, formed from the yoke 14 and the mating member 38.

A similar spider and bearing assembly 48 is provided between the yoke section 24 and the mating member 50 and is retained therebetween by bolts 52.

Connecting the two cardan yoke sections 14 and 24, through the spider and bearing assemblies 36 and 48, is an H-shaped intermediate member 54 which receives two of the four shaft portions of each of the spider and bearing assemblies and retains the bearing caps therein by means of retaining rings 56. Torque is thus transmitted from the drive shaft portion 10, through the yoke 14, and the spider and bearing assembly 36, to the intermediate member 54, and to the opposite cardan joint assembly and the output shaft 12.

The centering or positioning assembly between the two cardan sections comprise the socket portion 58, formed from the mating member 38, and the pilot shaft portion 60, formed from the mating member 50. The pilot shaft portion 60 is disposed within the socket portion 58 such that the center of the shaft p8rtion will be substantially at the center of the generally spherical socket. It is to be noted that the pilot shaft need not necessarily be cylindrical and may be of any polygonal shape, although it is shown as cylindrical for ease in the illustration and description thereof.

A ball centering device, indicated generally by the numeral 62, is received on the shaft portion 60 and within the socket portion 58. The centering ball serves to maintain the distance between the socket portion and the shaft member 60, and it will hereinafter be seen that the centering ball will maintain the proper axial location between the cardan joint sections with relative angularity between the two.

In order to prevent dirt, foreign material or water from interfering with the fit between the shaft portion 60, the centering ball 62 and the socket portion 58, a rubber seal 64 is provided. The seal is retained in the mating member 50 by means of groove 66 formed therein, and a tight fit, as at 68, about the socket portion 58. The seal 64 is free to flex or stretch with the angular motion of the universal joint sections without losing contact with the socket portion, to maintain an adequate seal at all conditions of operation.

The centering ball 62 is best illustrated in Figures 2 and 3. The outer surface of the ball is formed from a plurality of sections 70, the sections being arcuate in a plane normal to the axis of the centering ball and arcuate in cross section, or in a plane along the axis of the centering ball. Thus, the outer surface of the members will take the shape of a portion of a sphere, to correspond with the shape of the internal surface of the socket portion 58. A plurality of arcuate inner sections 72 form the inner surface of the ball and may be cylindrical in cross section in order to be received on the pilot shaft portion 60. It is to be understood that if the pilot shaft portion 60 is of some other polygonal configuration the inner surfaces of the inner sections 72 would be so formed as to correspond with the pilot shaft.

A resilient annular member 74 is disposed between the inner and outer sections 70 and 72 to bias the outer sections 70 in an outward radial direction and to bias the inner sections 72 in an inward radial direction, thus separating the separate sections and increasing the size and thickness of the centering ball to take up any clearance between the shaft portion 60 and the socket portion 58.

The resilient member 74 may be of such dimensions as to expand the outer and inner sections 70 and 72 to a size slightly larger than the socket portion 58 and slightly smaller than the outer dimension of the pilot shaft portion 60 respectively. In this manner, the preload provided will further insure a tight fit between the members to prevent any clearance, knock or vibrations from setting up objectionable noises, and to take up any manufacturing tolerances or wear that might occur in the parts.

What is claimed:

1. In a double universal joint of the type having a pair of universal joint assemblies with positioning means therebetween and secured thereto, a centering ball receivable in said positioning means and comprising a first plurality of members each having an outer surface forming a portion of a spherical surface, a second plurality of members each having an inner surface forming a portion of a cylindrical surface and resilient means disposed between said first and second pluralities of members and outwardly biasing said first plurality of members and inwardly biasing said second plurality of members to minimize clearance in said positioning means and prevent objectionable vibration and noise in said universal joint.

2. In a double universal joint of the type having a pair of universal joint assemblies with positioning means therebetween and secured thereto and including a substantially spherical socket and a substantially cylindrical stub shaft extending therewithin, a centering ball received in said socket and on said stub shaft and comprising a first plurality of members each having an outer surface forming a portion of a spherical surface, a second plurality of members each having an outer surface forming a portion of a cylindrical surface, and resilient means engaging each of said members and biasing said first plurality of members in an outward direction and said second plurality of members in an inward direction, said first plurality of members being spread by said resilient means to a size approaching the size of said socket and said second plurality of members being spread by said resilient means to a size approaching the size of said stub shaft to provide a preload on said positioning means and to prevent vibration and objectionable noise in said universal joint under normal operation.

3. In a universal joint of the type having a pair of universal joint assemblies connected by an intermediate member and having joint positioning means therebetween and secured thereto, said joint positioning means including a socket portion extending from one of said assemblies and a shaft portion extending from the other of said assemblies and into said socket portion, a centering ball receivable in said positioning means and comprising a plurality of arcuate portions forming an outer ring, the surface of said outer ring being a portion of a sphere, a plurality of portions forming an inner ring, and an annular resilient member bonded to said portions forming said inner and outer rings and biasing said portions forming said outer ring radially outwardly and said portions forming said inner ring radially inwardly to minimize clearance between said socket portion and said shaft portion and eliminate objectionable vibrations and noise during operation of said universal joint.

4. In a double universal joint of the type having a pair of universal joint assemblies with positioning means therebetween and secured thereto and including a socket and a stub shaft extending therewith, a centering ball received in said socket and on said stub shaft and comprising a first plurality of members each having an outer surface forming a portion of a spherical surface, a second plurality of members having a total inner surface corresponding to the shape of said stub shaft, and resilient means engaging each of said members and biasing said first plurality of members in a radially outward direction and said second plurality of members in a radially inward direction, said members approaching the sizes of said socket member and said stub shaft respectively to provide a preload on said positioning means and to prevent vibration and objectionable noise in said universal joint under normal operation.

5. In a universal joint of the type having a pair of universal joint assemblies connected by an intermediate member and having joint positioning means therebetween and secured thereto, said joint positioning means including a socket portion extending from one of said assemblies and a shaft portion extending from the other of said assemblies and into said socket portion, a centering ball receivable in said positioning means and comprising an outer ring formed from four separable arcuate sections, the surface of said outer ring being a portion of a sphere, an inner ring formed from four separable sections, the shape of the suface of said inner ring corresponding to the shape of the outer surface of said stub shaft, and an annular resilient member bonded to said sections forming said inner and outer rings and biasing said sections forming said outer ring radially outwardly and said sections forming said inner ring radially inwardly and into engagement with said socket member and said stub shaft respectively to minimize clearance between said socket portion and said shaft portion and eliminate objectionable vibrations and noise during operation of said universal joint.

6. In a universal joint of the type having a pair of universal joint assemblies connected by an intermediate member and having joint positioning means therebetween and secured thereto, said joint positioning means including a socket portion extending from one of said assemblies and a shaft portion extending from the other of said assemblies and into said socket portion, a centering ball receivable in said positioning means and comprising an outer ring formed from four arcuate sections, the surface of said outer ring being a portion of a sphere, an inner ring formed from four separable sections, the shape of the surface of said inner ring corresponding to the shape of the outer surface of said stub shaft, and resilient means between said inner and outer rings and biasing said outer ring sections radially outwardly and said inner ring sections radially inwardly into engagement with said socket member and said stub shaft to minimize clearance between said socket portion and said stub shaft and eliminate objectionable vibrations and noise during operation of said universal joint.

7. In a universal joint of the type having a pair of universal joint assemblies connected by an intermediate member and having joint positioning means therebetween and secured thereto, said joint positioning means including a socket portion extending from one of said assemblies and a shaft portion extending from the other of said assemblies and into said socket portion, a centering ball receivable in said positioning means and comprising a plurality of arcuate portions forming an outer ring, the surface of said outer ring being a portion of a sphere, a plurality of portions forming an inner ring, and resilient means between said inner and outer rings and biasing said outer ring sections radially outwardly and said inner ring sections radially inwardly and into engagement with said socket member and said stub shaft to minimize clearance between said socket portion and said stub shaft and eliminate objectionable vibrations and noise during operation of said universal joint.

No references cited.